July 4, 1950 J. L. HAVENS 2,513,863
CIRCULATION INDICATOR
Filed Oct. 18, 1946 2 Sheets-Sheet 1

John Lloyd Havens
INVENTOR.

BY
HIS ATTY.

July 4, 1950 — J. L. HAVENS — 2,513,863
CIRCULATION INDICATOR
Filed Oct. 18, 1946 — 2 Sheets-Sheet 2
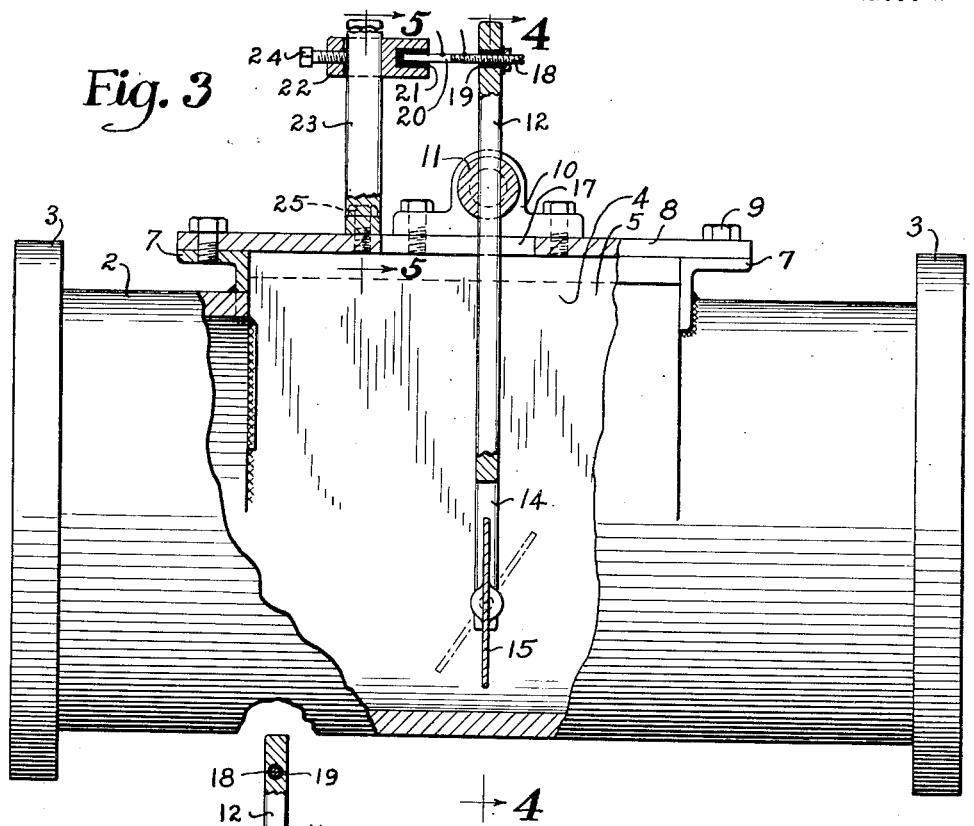
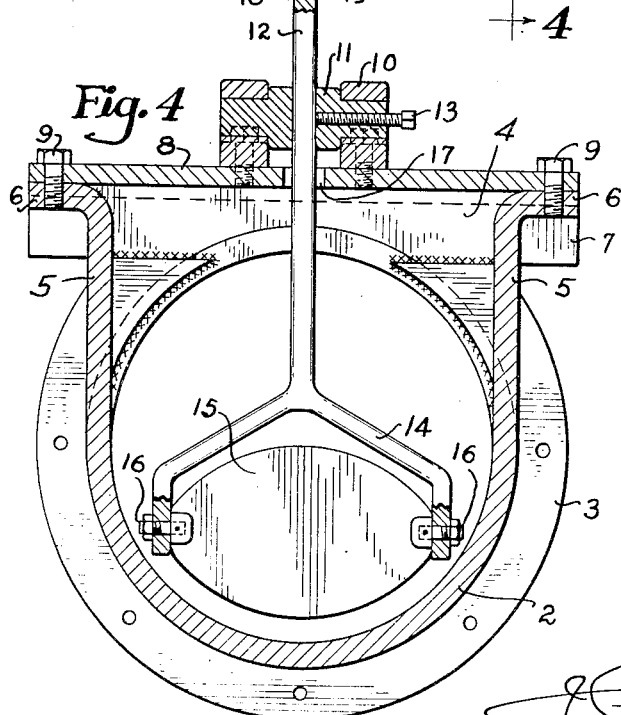
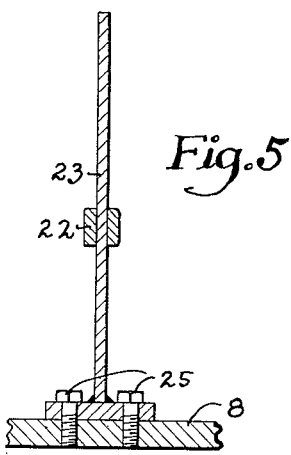
John Lloyd Havens
INVENTOR.

Patented July 4, 1950

2,513,863

UNITED STATES PATENT OFFICE 2,513,863

CIRCULATION INDICATOR

John Lloyd Havens, Wichita Falls, Tex.

Application October 18, 1946, Serial No. 703,929

5 Claims. (Cl. 200—81.9)

1

This invention relates to improvements in circulation indicators to be used on rotary well drills and the like for indicating when the drilling mud is being circulated.

In the drilling of deep wells by the rotary method, it is desirable to have a continuous flow of drilling mud that is pumped downward through the drill stem to the bottom of the well, flows outward through holes in the drill bit, and thence upward through the annular space between the drill pipe and the walls of the well, from which it is directed through a conduit to a slush pit for recirculation. Some of the mud used in the drilling of wells is very expensive and is purchased and mixed to a special consistency to give the best drilling results for the particular well that is being drilled. This mud is a bentonite clay, and is sold usually under such trade names as "Baroid," "Aquajel," etc.

This mud lubricates the bearings of the drill bits, cools the bits as they drill through the formation, and seals the walls of the well against caving or the entrance of liquids by exerting hydrostatic pressure against the walls of the well, until it is finally cased off with suitable casing.

Therefore, it is highly desirable to keep this mud in continuous circulation, but heretofore, it sometimes escaped at the bottom of the well through porous formation or into a cave in the earth's strata. When this occurs not only the expensive circulation medium is lost but the damage to the well and to the equipment used in drilling is apparent.

The primary object of this present invention is to provide for indicating when the drilling mud is being circulated, and to indicate immediately when such circulation ceases so that no damage will be done to the well or to the equipment.

This present indicator is mounted in the conduit that leads to the slush pit and is readily accessible to the workmen who, merely by glancing at the indicator or hearing a signal, can determine whether or not the drilling mud is being circulated.

A preferred embodiment of the invention together with a modification thereof are illustrated in the accompanying drawings in which:

Fig. 3 is an enlarged side elevation, partly in section and with parts broken away to show the method of adjusting the paddle on the indicator;

2

Figure 6:
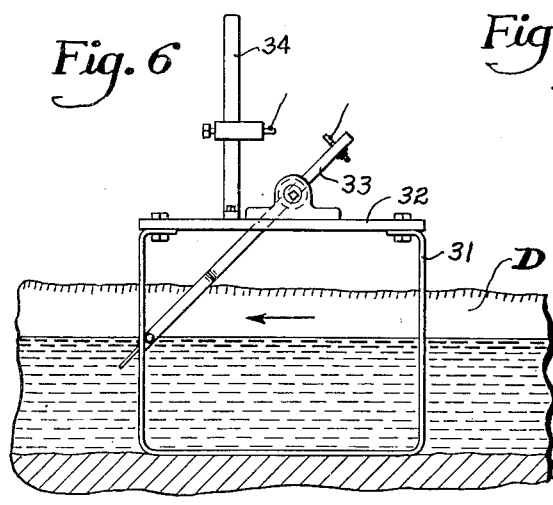
Figure 7:
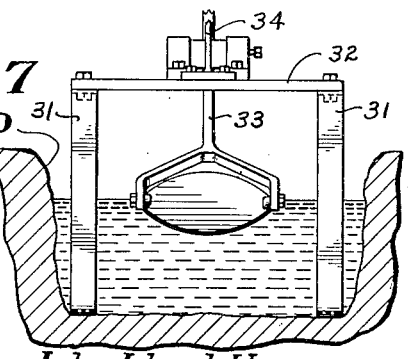

Fig. 4 is a cross section taken on the line 4—4 of Fig. 3;

Fig. 5 is a detail cross section taken on the line 5—5 of Fig. 3;

Fig. 6 is a side elevational view of a modified form of the invention for use in an open mud ditch; and Fig. 7 is an end elevation of the modified form with parts broken away to illustrate the details of construction.

Figure 1:
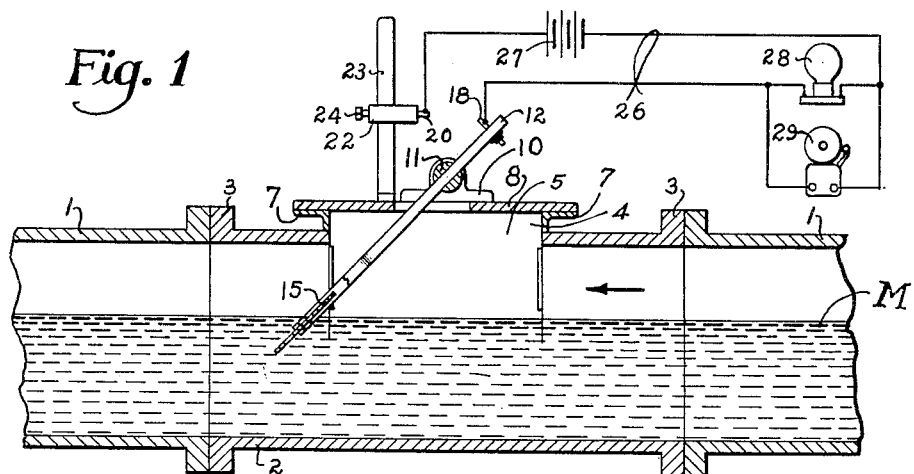
Fig. 1 is a longitudinal sectional view through the device, partly diagrammatic, showing mud flowing therethrough.
Figure 2:
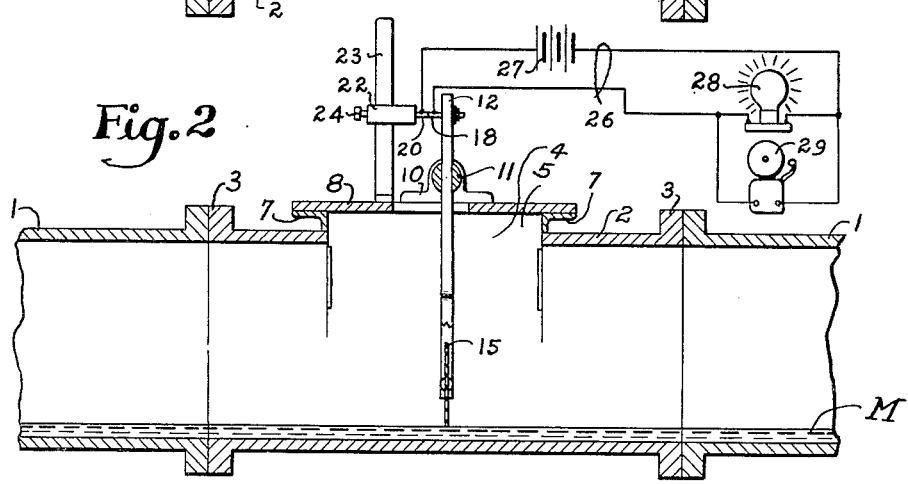
Fig. 2 is a view similar to Fig. 1, but without the flow of mud therethrough.

The invention is adapted to be used in the flow line of a rotary drilling apparatus which directs mud from the well, which flow line is designated generally by the numeral 1, in Figs. 1 and 2. This flow line usually comprises a pipe that leads from the casing of the well to a receptacle in the form of a slush pit.

In this form of the invention, the indicator is connected in the flow line 1, for which purpose, it is shown as including a tubular housing 2, having couplings 3 at opposite ends thereof, adapted to be connected in the flow line 1, whereby the mud flowing from the well will pass through the housing 2, as it is directed to the slush pit. The upper portion of the housing 2 is shown as initially open, as indicated at 4, which opening 4 is enclosed at opposite sides of the housing 2 by upstanding walls 5, having outturned upper edges 6, and by cross supports 7 rigidly secured to the top of the housing 2, as shown in Figs. 3 and 4. A cover plate 8 is seated upon the out-turned flanges 6 and the cross supports 7, and is rigidly secured thereto by screw bolts 9, so as to enclose the opening 4 and the top portion of the housing 2.

Seated upon the cover plate 8 in spaced relation are bearing brackets 10 rigidly secured to the cover plate. Mounted in bridging relation between the bearing brackets 10 is a journal member 11, the opposite ends of which are shown somewhat reduced and extending into the bearing brackets 10 for turning movement therein.

An upwardly extending arm 12 extends through the journal member 11 and is adapted for sliding adjustment relative thereto. The arm 12 is held in adjusted position with respect to the journal member 11 by means of a set screw 13 which is shown as extending axially through the journal member into engaging relation with a side of the arm 12.

The lower end of the arm 12 is shown as bifurcated as indicated at 14 in embracing relation with a paddle member 15. The paddle member 15 is held in place by bolts 16 connected therewith and extending through the respective arms of the bifurcated portion 14, whereby the paddle member may be adjusted pivotally relative to the arm and then secured in adjusted position by the bolts. The arm 12 extends through a slot 17 in the cover 8, so as to swing lengthwise of the housing 2 under the influence of the paddle member 15 when engaged by a stream of mud M, flowing through the flow line 1.

The upper end of the arm 12 carries a contact member 18 screw-threaded through an insulating bushing 19 for axial adjustment with respect to the arm 12.

The contact member 18 is in position to engage a contact member 20 mounted in an insulating bushing 21 carried by a bracket 22 in a position facing the end of the contact member 18. The bracket 22 is mounted slidably on a standard 23, capable of vertical adjustment relative thereto and is adapted to be secured in fixed relation thereto by a set screw 24. The standard 23 is mounted on the cover 8 to which it is secured by screw bolts 25.

Referring to Figs. 1 and 2, the contact members 18 and 20 are shown as connected with opposite sides of an electric circuit 26 that includes therein a source of electric supply, generally indicated as a battery 27, as well as one or more signal devices, such as an electric lamp 28, and an annunciator or bell 29. Either or both of these signal devices may be used as desired.

The operation of the device will be evident from the foregoing description taken in connection with Figs. 1 and 2, which show the paddle operating respectively in a full flow of mud M, and in a reduced or minimum flow thereof through the flow line. The direction of the flow is indicated in Fig. 1 by the arrow.

When a full flow of mud is passing through the flow line 1, the force of the mud will act on the paddle member 15 to cause the arm 12 to be moved to the position shown in Fig. 1, holding the contact member 18 out of engagement with the contact member 20, thereby breaking the circuit 26. If the flow of mud be decreased for any reason, such for instance, as to that shown in Fig. 2, the arm 12 will drop by gravity to the position shown therein and thus move the contact member 18 into engagement with the contact member 20. This will close the circuit 26 and electrically energize the signal device or devices connected therein, such as the lamp 28 and the annunciator 29. This will warn the driller of the stoppage of mud and cause him to inspect the apparatus to detect the cause thereof.

The device operates in response to the desired level of fluid flowing past the paddle member 15 and may be set to operate in response to different positions of the paddle member. Where it is used for a heavy flow of mud, it will operate readily in response thereto by a vertical adjustment of the arm 12 with respect to the bearing member 11, after which the arm may be located in set position by the screw 13. In like manner, the arm may be adjusted to a lower position when it is desired to reduce the normal flow of mud through the flow line.

When an adjustment is made of the arm 12, a corresponding adjustment should be made of the bracket 22, so as to position the contact member 20 at a level whereby it will engage the contact member 18. This adjustment may be made by sliding the bracket 22 vertically relative to the standard 23 and then securing it in its adjusted position by the set screw 24.

Where the flow from the well is through an open ditch instead of a flow line, as shown in Figs. 6 and 7, and which ditch is indicated at D therein, the signal indicator may be used in connection therewith by mounting the operating parts on a framework comprising a pair of standards 31 connected together by a cover plate 32. The paddle arm 33 is mounted on the cover plate 32 and carries a contact member in position to engage a cooperating contact member mounted on a bracket 34. These contact members are adapted to be connected with a signal circuit which functions generally in the manner described above in connection with Figs. 1 to 5. In this form, the operating parts are not enclosed as is true of Figs. 1 to 5.

The contact members and the mounting thereof on the paddle arm 33 and bracket 34, as well as the mounting of the latter parts, are substantially the same in Figs. 6 and 7, as the corresponding parts described above in connection with Figs. 1 to 5.

While the invention has been illustrated and described in one embodiment together with a modification thereof, it is recognized that variations and changes may be made therein without departing from the invention, except as specified in the claims.

I claim:

1. Fluid level indicator means for the mud flow line of well drilling apparatus, comprising a supporting structure adapted to be mounted in the flow line and having a top plate thereon, bearing brackets mounted on the top plate in spaced relation, a journal member extending between the bearing brackets and journaled thereon, an arm extending upwardly through the journal member and having slidable connections therein, means for securing the arm in an adjusted position with respect to the journal member, a paddle member suspended by the lower end portion of the arm and adapted to be disposed in position to be acted on by mud flowing through the flow line.

2. Fluid level indicator means for the mud flow line of well drilling apparatus, comprising a supporting structure adapted to be mounted in the flow line and having a top plate thereon, bearing brackets mounted on the top plate in spaced relation, a journal member extending between the bearing brackets and journaled thereon, an arm extending upwardly through the journal member and having slidable connections therewith, means for securing the arm in an adjusted position with respect to the journal member, a paddle member suspended by the lower end portion of the arm and adapted to be disposed in position to be acted on by mud flowing through the flow line, a contact member carried by the arm, a standard supported on the top plate adjacent the arm, a bracket adjustably mounted on the standard, a second contact member carried by the bracket in position for engagement by the first-mentioned contact member.

3. Fluid level indicator means for the mud flow line of well drilling apparatus, comprising a supporting structure adapted to be mounted in the flow line and having a top plate thereon, bearing brackets mounted on the top plate in spaced relation, a journal member extending between the bearing brackets and journaled thereon, an arm extending upwardly through the journal member and having slidable connections therewith, said arm having a bifurcated lower end portion, a paddle member suspended on said arm between the arms of said bifurcated portion, means for adjusting the plane of said paddle relative to the plane of said bifurcated end portion, means for securing said arm in an adjusted position with respect to the journal member, said paddle member being disposed in position to be acted on by mud flowing through the flow line, a contact member carried by the arm, a standard supported on the top plate adjacent the arm, a bracket adjustably mounted on the standard, a second contact member carried by the bracket in position for engagement by the first-mentioned contact member.

4. Fluid level indicator means for the mud flow line of well drilling apparatus, comprising a supporting structure adapted to be mounted in the flow line and having a top plate thereon, bearing brackets mounted on the top plate in spaced relation, a journal member extending between the bearing brackets and journaled thereon, an arm extending upwardly through the journal member and having slidable connections therewith, means for securing the arm in an adjusted position with respect to the journal member, a paddle member suspended by the lower end portion of the arm and adapted to be disposed in position to be acted on by mud flowing through the flow line, means maintaining said paddle at right angles to the direction of the movement of the mud flowing through the flow line, a contact member carried by the arm, a standard supported on the top plate adjacent the arm, a bracket adjustably mounted on the standard, a second contact member carried by the bracket in position for engagement by the first-mentioned contact member.

5. In a fluid circulation indicator for a mud flow line of well drilling apparatus, a supporting structure adapted to be mounted in the flow line, a free journal mounted on the supporting structure, an arm suspended by the journal and having means therein to be moved by the flow of mud, said arm being in position to be suspended by gravity in an upright position and to swing out of said position by flow of mud in the flow line acting on said means, said means including a flat paddle separate from the arm, pivots supporting the paddle on the arm, and means for securing the paddle in adjusted position relative to the arm.

JOHN LLOYD HAVENS.

REFERENCES CITED

The following references are of record in the file of this patent:

UNITED STATES PATENTS

| Number | Name | Date |
|---|---|---|
| 317,289 | Boyle | May 5, 1885 |
| 384,570 | Grovesteen | June 12, 1888 |
| 836,377 | Filson | Nov. 20, 1906 |
| 1,292,334 | Larsen | Jan. 21, 1919 |
| 1,452,899 | Stokoe | Apr. 24, 1923 |
| 2,041,549 | Jaeger | May 19, 1936 |
| 2,127,422 | Phaneuf | Aug. 16, 1938 |
| 2,127,823 | Leifheit | Aug. 23, 1938 |
| 2,211,553 | Bogue | Aug. 13, 1940 |